United States Patent
Karr

(10) Patent No.: US 7,434,091 B1
(45) Date of Patent: Oct. 7, 2008

(54) FLEXIBLY COMBINING MIRRORING, CONCATENATION AND STRIPING IN VIRTUAL STORAGE DEVICES

(75) Inventor: Ronald S. Karr, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 561 days.

(21) Appl. No.: 11/005,993

(22) Filed: Dec. 7, 2004

(51) Int. Cl.
*G06F 11/00* (2006.01)

(52) U.S. Cl. .......................................... 714/6; 711/114
(58) Field of Classification Search ...................... 714/4; 711/114
See application file for complete search history.

(56) References Cited

U.S. PATENT DOCUMENTS

| | | | |
|---|---|---|---|
| 5,991,804 | A | 11/1999 | Bolosky et al. |
| 6,499,039 | B1 | 12/2002 | Venkatesh et al. |
| 6,629,202 | B1 | 9/2003 | Cabrera et al. |
| 6,880,102 | B1 * | 4/2005 | Bridge ........................... 714/6 |
| 6,883,073 | B2 * | 4/2005 | Arakawa et al. ............ 711/162 |
| 7,076,688 | B2 * | 7/2006 | Yamamoto ..................... 714/6 |
| 7,131,027 | B2 * | 10/2006 | Kodama et al. ................. 714/6 |
| 2002/0120763 | A1 | 8/2002 | Miloushev et al. |
| 2004/0133607 | A1 | 7/2004 | Miloushev et al. |
| 2007/0180306 | A1 * | 8/2007 | Soran et al. ..................... 714/6 |

OTHER PUBLICATIONS

"Veritas Storage Foundation™ Technical Overview," Veritas Software Corporation, pp. 1-37, Apr. 2002.

* cited by examiner

*Primary Examiner*—Yolanda L Wilson
(74) *Attorney, Agent, or Firm*—Meyertons Hood Kivlin Kowert & Goetzel, P.C.; B. Noël Kivlin

(57) ABSTRACT

A volume server for flexibly combining mirroring, striping and concatenation in virtual storage devices includes virtualization functionality and a layout table. The virtualization functionality may be configured to aggregate storage within one or more block devices into a logical volume. The layout table may include multiple extent entries, where each extent entry represents a mapping of an extent of block device storage to a virtual address range of the logical volume, including an indication of a stripe of the logical volume to which the extent is mapped. An overlap in virtual address range between a first and a second extent entry may indicate mirroring of the overlapping blocks at each extent. In response to a storage request, the virtualization functionality may obtain a block device address corresponding to the logical volume virtual address of the storage request from the layout table.

35 Claims, 13 Drawing Sheets

Table Metadata 510

Vol size: 2000 MB
Columns:3   Stripe unit size: 10KB

Extent Entries 520

| Storage Device | Extent Offset | Extent Length | Column Number | Column Offset | Flags |
|---|---|---|---|---|---|
| Disk 110A | 0 | 1200 | 0 | 0 | VALID;RW |
| Disk 110B | 0 | 1200 | 1 | 0 | VALID;RW |
| Disk 110C | 0 | 1200 | 2 | 0 | VALID;RW |
| Disk 110D | 0 | 1200 | 0 | 0 | VALID;RW |
| Disk 110E | 0 | 1200 | 1 | 0 | VALID;RW |
| Disk 110F | 0 | 1200 | 2 | 0 | VALID;RW |
| ... | ... | ... | ... | ... | ... |

FIG. 5

Table Metadata 510

Vol size: 2000 MB
Columns: 2   Stripe unit size: 50KB

Extent Entries 520

| Storage Device | Extent Offset | Extent Length | Column Number | Column Offset | Flags |
|---|---|---|---|---|---|
| Disk 110A | 0 | 1200 | 0 | 0 | VALID;RW |
| Disk 110B | 0 | 1200 | 1 | 0 | VALID;RW |
| Disk 110C | 2000 | 400 | 0 | 0 | VALID;RW |
| Disk 110C | 3000 | 600 | 0 | 400 | VALID;RW |
| Disk 110E | 0 | 800 | 0 | 1000 | VALID;RW |
| Disk 110F | 400 | 600 | 1 | 0 | VALID;RW |
| ... | ... | ... | ... | ... | ... |

*FIG. 6*

Table Metadata 510
Vol size: 1500 MB
Columns:1  Stripe unit size: 10KB

Extent Entries 520

| Storage Device | Extent Offset | Extent Length | Column Number | Column Offset | Flags |
|---|---|---|---|---|---|
| Disk 110A | 0 | 1000000 | 0 | 0 | VALID;RW |
| Disk 110B | 0 | 1000000 | 0 | 1000000 | VALID;RW |
| Disk 110C | 0 | 1000000 | 0 | 2000000 | VALID;RW |
| Disk 110D | 0 | 1000000 | 0 | 0 | VALID;RW |
| Disk 110E | 0 | 1000000 | 0 | 1000000 | VALID;RW |
| Disk 110F | 0 | 1000000 | 0 | 2000000 | VALID;RW |
| ... | ... | ... | ... | ... | ... |

*FIG. 7*

Table Metadata 510

Vol size: 6GB
Columns:3    Stripe unit size: 100KB

Extent Entries 520

| Storage Device | Extent Offset | Extent Length | Column Number | Column Offset | Flags |
|---|---|---|---|---|---|
| Disk 920A | 0 | 2GB | 0 | 0 | VALID; RW |
| Disk 920B | 0 | 2GB | 1 | 0 | VALID; RW |
| Disk 920C | 0 | 2GB | 2 | 0 | VALID; RW |
| Disk 930A | 0 | 2GB | 0 | 0 | VALID; RW |
| Disk 930A | 2GB | 1GB | 1 | 0 | VALID; RW |
| Disk 930B | 0 | 1GB | 1 | 1GB | VALID; RW |
| Disk 930B | 1GB | 2GB | 2 | 0 | VALID; RW |

FLEXIBLY COMBINING MIRRORING, CONCATENATION AND STRIPING IN VIRTUAL STORAGE DEVICES

BACKGROUND OF THE INVENTION

1. Field of the Invention

This invention relates to computer systems and, more particularly, to the management of striping, concatenation and mirroring within storage virtualization environments.

2. Description of the Related Art

Many business organizations and governmental entities rely upon applications that access large amounts of data, often exceeding a terabyte or more of data, for mission-critical applications. Often such data is stored on many different storage devices, which may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, or data parity, as well as features to increase data access performance, such as disk striping or concatenation, may be implemented in the storage model via hardware or software.

For certain kinds of storage applications, it may be desirable to utilize both data mirroring and disk striping in order to achieve both enhanced performance and enhanced reliability. For example, it may be desirable to stripe application data across a first set of physical disks, and to then mirror the entire first set of physical disks at a second set of physical disks. In order to represent the logical relationships between the data residing on various disks in such a configuration, a hierarchical (e.g., tree-structured) data structure may be employed, where each node of the hierarchy may contain pointers to and metadata about underlying storage objects (e.g., mirrors and/or stripes). However, the use of a hierarchical data structure may have disadvantages, especially for large, complex hierarchies. Frequent traversals of the hierarchy may be required, which may lead to excessive use of processing and/or memory resources. Furthermore, if I/O errors are handled on a per-mirror basis (i.e., if an entire mirror is designated as either on-line or disabled), under some circumstances more storage than necessary may be made inaccessible if an I/O error occurs. For example, when an error is encountered at a single disk that forms part of a striped mirror, the whole mirror (potentially including a large number of disks that remain error-free) may have to be disabled, because the hierarchical data structure may not provide an efficient mechanism for disabling the single disk at which the error occurred while allowing I/O operations at the remaining disks to continue. It may be desirable to represent mirroring and striping using a single flat (i.e., non-hierarchical) data structure that allows flexible configuration of mirrored and/or striped sub-ranges of storage and supports an efficient way of identifying and disabling only those storage devices of a striped mirror where an error may have occurred.

SUMMARY OF THE INVENTION

Various embodiments of a volume server and method for flexibly combining mirroring, striping and concatenation in virtual storage devices are disclosed. According to a first embodiment, a volume server may comprise virtualization functionality and a layout table. The virtualization functionality may be configured to aggregate storage within one or more block devices into a logical volume accessible by a volume client. The layout table may include a plurality of extent entries, where each extent entry represents a mapping of an extent of storage within a block device to a virtual address range of the logical volume, where the virtual address range may include an indication of a stripe of the logical volume to which the extent is mapped. A first extent entry in the layout table may overlap in virtual address range with a second extent entry, indicating that at least part of the virtual address range of the first extent is mirrored at the second extent. The virtualization functionality may also be configured to access the layout table to obtain one or more block device addresses corresponding to a logical volume virtual address at which a storage operation is requested by the volume client.

The layout table may allow flexible configuration of striping, concatenation and mirroring. For example, only part of a striped or concatenated logical volume may be mirrored, or a given mirror of a source extent may be spread over multiple different extents, some of which may be on different block devices. In some embodiments, the layout table may include extent entries for virtual block devices, while in others the extent entries may represent physical block devices or a mix of physical and logical block devices.

The layout table may have metadata associated with it in some embodiments, where the metadata may include a representation of the stripe geometry of the volume (e.g., the number of stripe columns or striped devices and a stripe unit size) as well as the size of the volume. Each extent entry within the layout table may include a representation of the extent (i.e., an identification of the block device of which the extent forms a part, an offset within the block device where the extent starts, and an extent length) and the virtual address range or column address range to which the extent is mapped (i.e., a column number and an offset within the column). In addition, each extent entry may also include various flags indicating the status of the extent (e.g., whether the extent contains valid data, or whether the data in the extent is stale or invalid due to an earlier I/O error or because the extent is a new or recovering extent), access permissions to the extent (such as Read-Write, Read-Only or Write-Only permissions), etc.

According to one embodiment, the virtualization functionality may be further configured to respond to a write error by selecting an entry (which may be referred to as an "error" entry) from the layout table representing the extent at which the write error occurred, and to search for other valid extent entries within the layout table whose virtual address ranges overlap with the virtual address range of the error entry. If one or more valid non-error entries are found whose collective virtual address range fully overlaps the virtual address range of the error entry, indicating that the entire virtual address range of the error entry has at least one remaining valid mirror, only the error extent may be disabled, while I/O may be allowed to continue at other extents. If at least some subset of the virtual address range of the error entry is found for which no overlapping valid extent entry exists, the volume may be disabled. In general, any desired minimum number of valid mirrors may be specified in order for a mirrored logical volume to remain enabled. If, for example, the minimum number of valid mirrors is set to two in a particular embodiment, access to the logical volume via the layout table may be disabled if the number of valid or non-error extents mapped to any given block of the logical volume falls below two.

According to another embodiment, the virtualization functionality may respond to a detection of a read error at a target extent by searching for alternate valid non-error extent entries containing the targeted data block, and reading the block from the corresponding extent if one is found. As in the case of write errors, the virtualization functionality may also be configured to verify that a specified minimum number of valid non-error entries overlapping with the target extent remain, before disabling the error extent (i.e., the extent at which the read error occurred) and allowing further I/O operations to continue. In one embodiment, the virtualization functionality may also be configured to attempt to repair one or more error extents, e.g., by writing the data of the target block obtained from a valid non-error extent to the error extents. If a repair is successful, the error extent may be returned to a valid, non-error state.

BRIEF DESCRIPTION OF THE DRAWINGS

FIG. 5 is a block diagram illustrating an example of a layout table according to one embodiment.

FIGS. 6-8 are block diagrams collectively illustrating aspects of functionality provided by layout tables in different embodiments.

Figure 1:
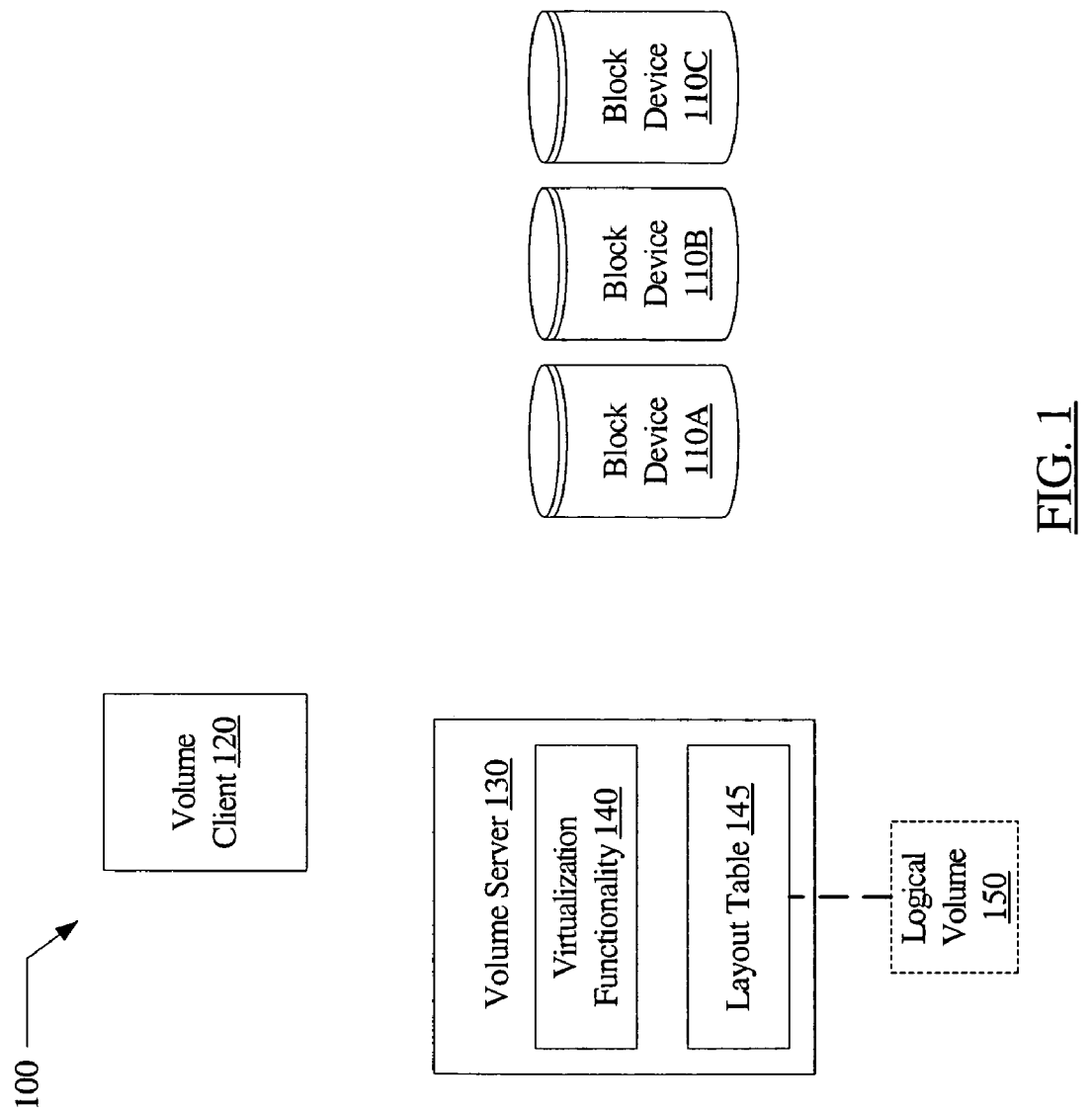
FIG. 1 is a block diagram illustrating one embodiment of a storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates a storage system 100 according to one embodiment. In the illustrated embodiment, system 100 includes block devices 110A, 110B, and 110C (which may be collectively referred to herein as block devices 110), a volume server 130 including virtualization functionality 140, and a volume client 120. Virtualization functionality 140 may be configured to aggregate storage in block devices 110 into a logical volume 150 whose structure may be represented within volume server 130 as layout table 145, and to make the logical volume accessible to volume client 120. Virtualization functionality 140 may also be configured to access layout table 145 to obtain one or more block device addresses corresponding to a logical volume virtual address at which a storage operation is requested by volume client 120.

Generally speaking, a block device may comprise any hardware or software entity that provides a collection of linearly addressed data blocks that can be read or written. For example, in one embodiment a block device 110 may be a physical block device such as a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. In some embodiments, a block device may also be a logical or virtual storage device resulting from a mapping of blocks of one or more physical storage devices.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device may read or write blocks directly to the device, bypassing any file system that may be in use. In some embodiments, a block device 110 presented by an operating system for use by a consumer may present relatively few primitives through which the device may be manipulated. For example, in one embodiment a block device 110 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 110 that are physical storage devices, such as disks or tape drives, may be configured to present some form of SCSI interface, though other interfaces are possible and contemplated.

Generally speaking, a volume 150 may comprise a block device that may be presented directly for use by a block device consumer, e.g., a volume client 120. In one embodiment, a volume client 120 may be a file system or an application (such as a database application, for example) that can directly use block devices. As described in greater detail below, in some embodiments employing block device virtualization, a given volume 150 may be associated with several logical or physical block devices. In such embodiments, each block device included in the logical organization of a given volume or virtualized block device may be referred to as a storage object or logical storage object.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume implementing various block virtualization features may be directly accessible by a consumer without the issues presented by such disk drivers.

A volume manager, such as volume server 130, may introduce virtualization of blocks, creating some number of virtualized block devices out of one or more physical or logical block devices. (In some embodiments, devices such as disk arrays and virtualization switches may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

Figure 2A:
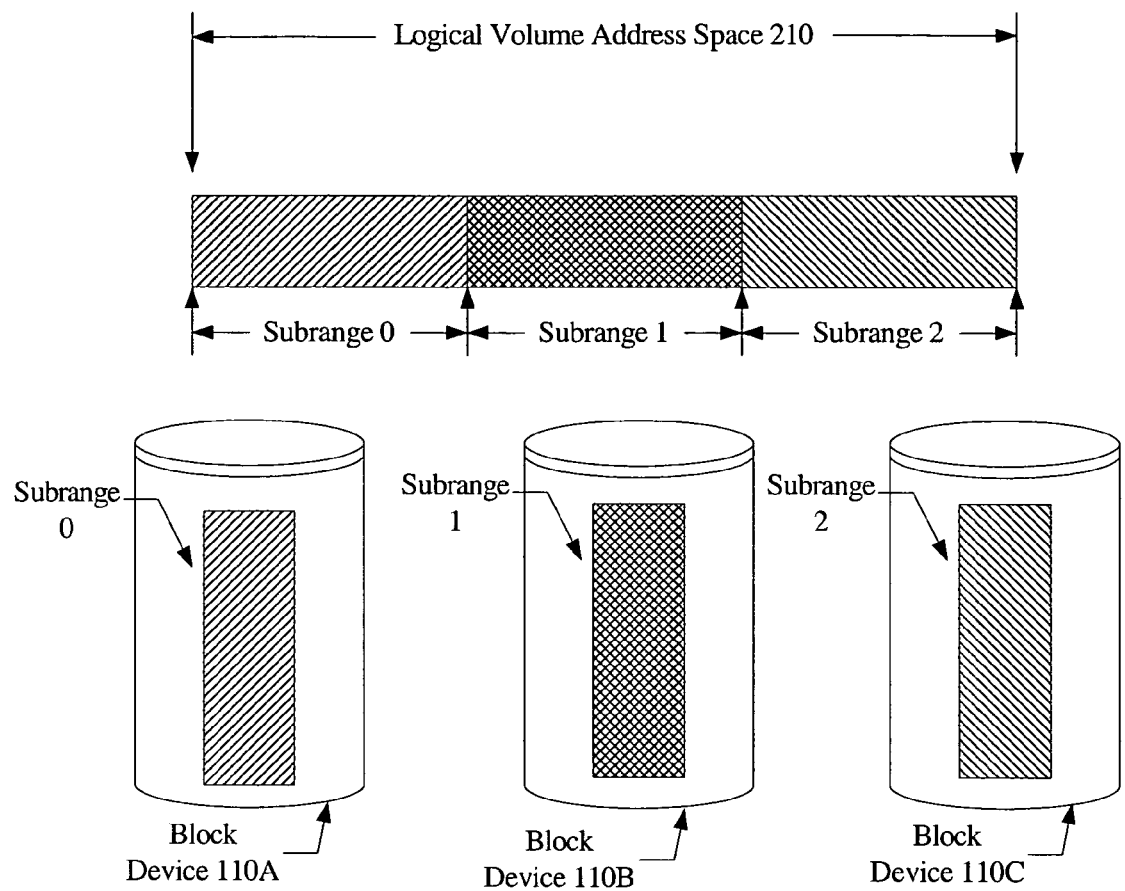
FIGS. 2a, 2b and 2c are block diagrams illustrating embodiments employing device concatenation, striping and mirroring, respectively.
Figure 2B:
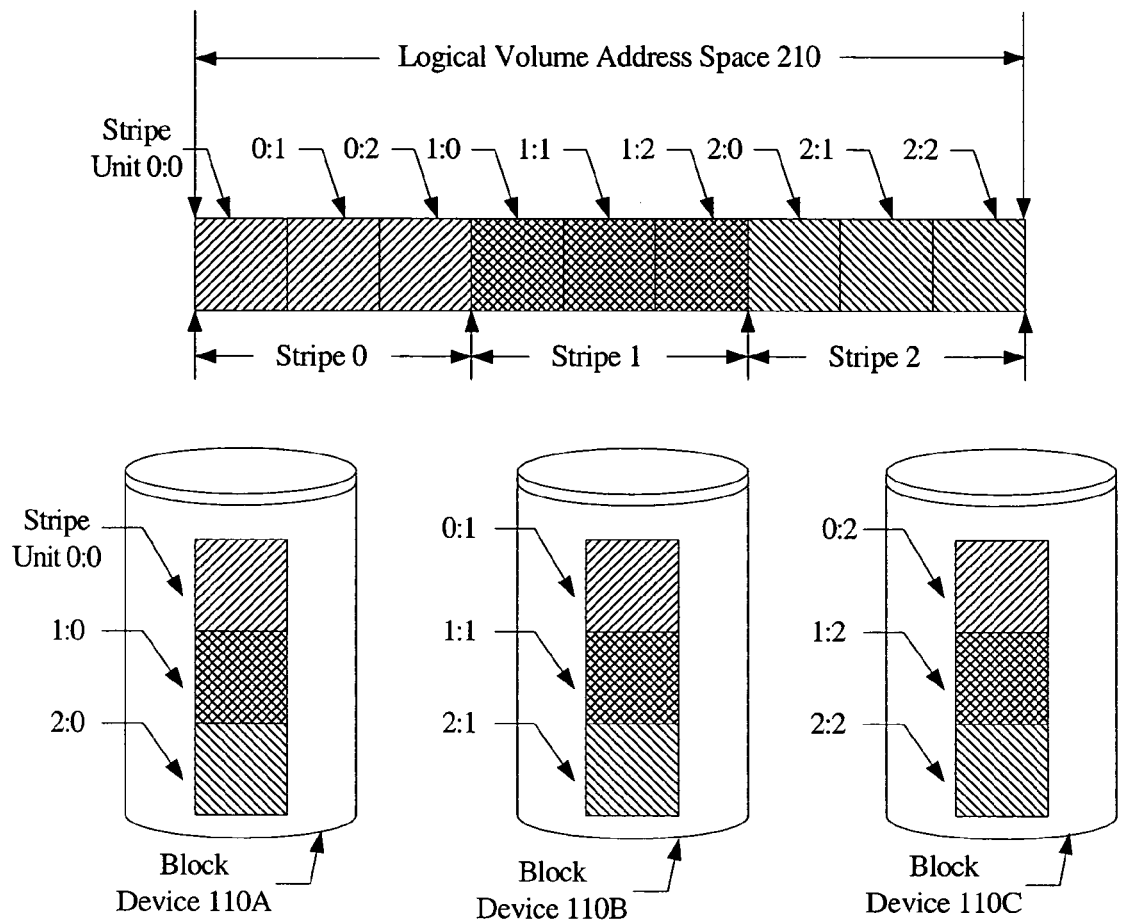
Figure 2C:
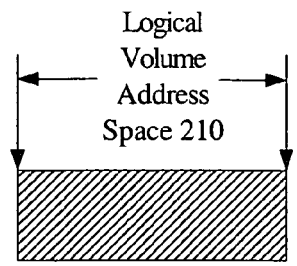
Figure 2C:
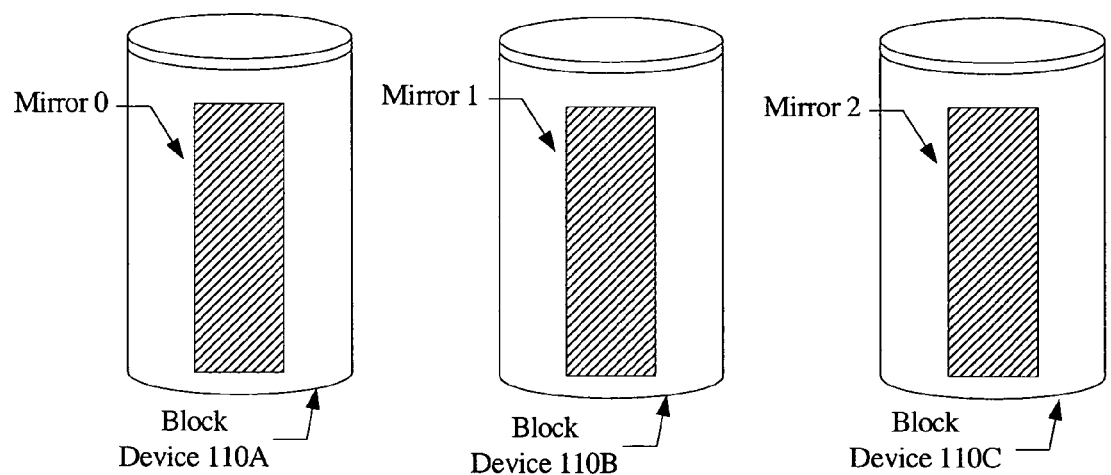

In various embodiments, block virtualization can support the creation of virtualized block devices implementing numerous different types of storage functions. FIGS. 2a, 2b and 2c are block diagrams illustrating three such storage functions. FIG. 2a illustrates device concatenation (also known as device spanning) according to one embodiment, in which multiple physical or logical block devices 110 may be joined to appear as a single large logical volume 150. That is, the logical volume address space 210 of volume 150 may be divided into sub-ranges such as sub-range 0, sub-range 1, and sub-range 2, and each sub-range may be mapped to a different block device 110. Concatenation thus allows larger volumes to be created than could be created using a single block device 110. If each block device is a physical disk, for example, the storage bandwidth and I/O rate may attain maximum values that equal the sum of the storage bandwidths and I/O rates of the physical disks. However, due to uneven access patterns, typical I/O bandwidth and I/O rate may be less than the sum of the maximum corresponding metrics for the constituent disks. For example, if logical volume 150 contains a dozen tables of a database system, it is likely that a given table may be contained fully or mostly within a single sub-range. As some tables may be accessed more frequently than others, a disk containing a sub-range with a frequently accessed table may be utilized more heavily than others, potentially leading to excessive disk contention at such a "hot spot," and to an overall reduction in I/O performance levels.

Device striping, as illustrated in FIG. 2b for one embodiment, may distribute logically contiguous blocks of a logical volume more evenly across constituent block devices, allowing for a better load distribution. In addition to the simple form of striping across block devices illustrated in FIG. 2a, a more general and flexible form of striping using logical constructs called columns may be implemented in some embodiments, as described below in further detail. In the example illustrated in FIG. 2a, logical volume address space 210 may be subdivided into stripes 0, 1 and 2, each of which may be further subdivided into stripe units, such that each stripe has one stripe unit on each block device 110. Thus, stripe 0 may be divided into stripe units 0:0, 0:1, and 0:2, which may be mapped to storage within block devices 110A, 110B and 110C respectively. Similarly, stripe 1 may be divided into stripe units 1:0, 1:1, and 1:2, which may be mapped to block devices 110A, 110B and 110C, respectively. A simple device-based striping configuration (as opposed to a column-based striping configuration, which will be described later) for a logical volume containing D data blocks may be characterized by a stripe unit size U (e.g., the number of data blocks within a stripe unit) and the number of constituent block devices N. For example, if D=12,000, U=100, and N=3, the number of stripes would be 40 (D/(U×N)). The mapping of a given logical block of the volume 150 to a block of a constituent block device 110 may be determined by a formula using U and N. For example, if the constituent block devices and stripes are each numbered starting with 0, then the following calculations may be used to determine where the $I^{th}$ logical block of volume 150 may be mapped:

Block device number $B = (I \text{ div } U) \mod N$

Stripe number $S = I \text{ div } (N \times U)$

Offset within block device $O = (S \times U) + (I \mod U)$ where the div operator means an integer division with remainders discarded, and the mod operator means taking the remainder. For example, block number 2345 of volume 150 in the example above (where D=12,000, U=100 and N=3) would be mapped to device 2, stripe 7, and offset 745 within device 2.

As striping distributes consecutive blocks more evenly across underlying storage devices than concatenation, the typical device throughput obtained from a striped storage device may approach the sum of the device throughputs of the constituent devices. For example, if a logical volume 150, striped across four disks, contains a dozen tables of a database system, it is unlikely that a given table may be contained fully or mostly within a single stripe unit. Even if some tables are accessed more frequently than others, the I/O load corresponding to the heavily used tables may be distributed more uniformly across the disks than in the case of concatenation, preventing excessive disk contention at a single "hot spot" disk. A smaller stripe unit size may help to distribute accesses more uniformly across constituent block devices 110. However, I/O performance for large blocks of data or for sequential access patterns may suffer as the stripe size is reduced, because a single I/O request from a storage consumer may have to be broken up into multiple smaller requests for each stripe unit, which may be handled less efficiently than single large requests. The choice of an appropriate stripe unit size may therefore have to be made based upon the expected I/O access patterns for the application being supported.

While device striping may provide performance benefits over device concatenation, the reliability of striped storage and concatenated storage may be similar. If a volume 150 is striped or concatenated across N identical disks, for example, the reliability for volume 150 (measured in units such as Mean-Time-Between-Failures or MTBF) may be approximately N times less than the reliability of a single disk. For example, if N=4 and each disk has a MTBF of 100,000 hours, the MTBF of volume 150 may be approximately 25,000 hours.

In order to improve reliability, an approach such as mirroring may be employed, as illustrated in FIG. 2c for one embodiment. A mirrored logical volume may include two or more replicas (which may be termed mirrors or mirrored plexes) of the logical volume's address space. One copy of each data block of the logical volume address space 210 may be located within each mirror, such as Mirrors 0, 1 and 2 of FIG. 2c. As described below in further detail, in some embodiments a layout table may be employed to flexibly combine mirroring with striping. Mirrored storage improves reliability because it uses storage redundancy. As multiple copies of each data block are maintained, a failure at a single constituent block device 110 may occur without causing data to become unavailable. A mirrored data block (i.e., any block within a mirrored volume 150) may only become unavailable if all mirrors fail. If modern disk drives are used as the underlying block devices, the likelihood of even two failures at about the same time may be extremely small. The reliability of a mirrored logical volume may depend on a number of factors, and may approach or greatly exceed the sum of the reliabilities of its constituent mirrors. Factors affecting the reliability may include, for example, the speed with which failed underlying devices are replaced, and the granularity at which failed components are disabled. Faster replacement and finer granularity may tend to result in higher reliability. The increased reliability of a mirrored volume, however, may come at the cost of reduced effective capacity (more storage may be required for redundancy) and reduced write performance. A read operation at a mirrored volume 150 may be satisfied from any constituent block device 110, while a write operation on a data block may require a copy of the block to be written to each constituent block device 110. Thus, a write-intensive workload may result in higher bandwidth requirements in a storage network and/or at the physical storage devices of a mirrored volume.

Figure 3:
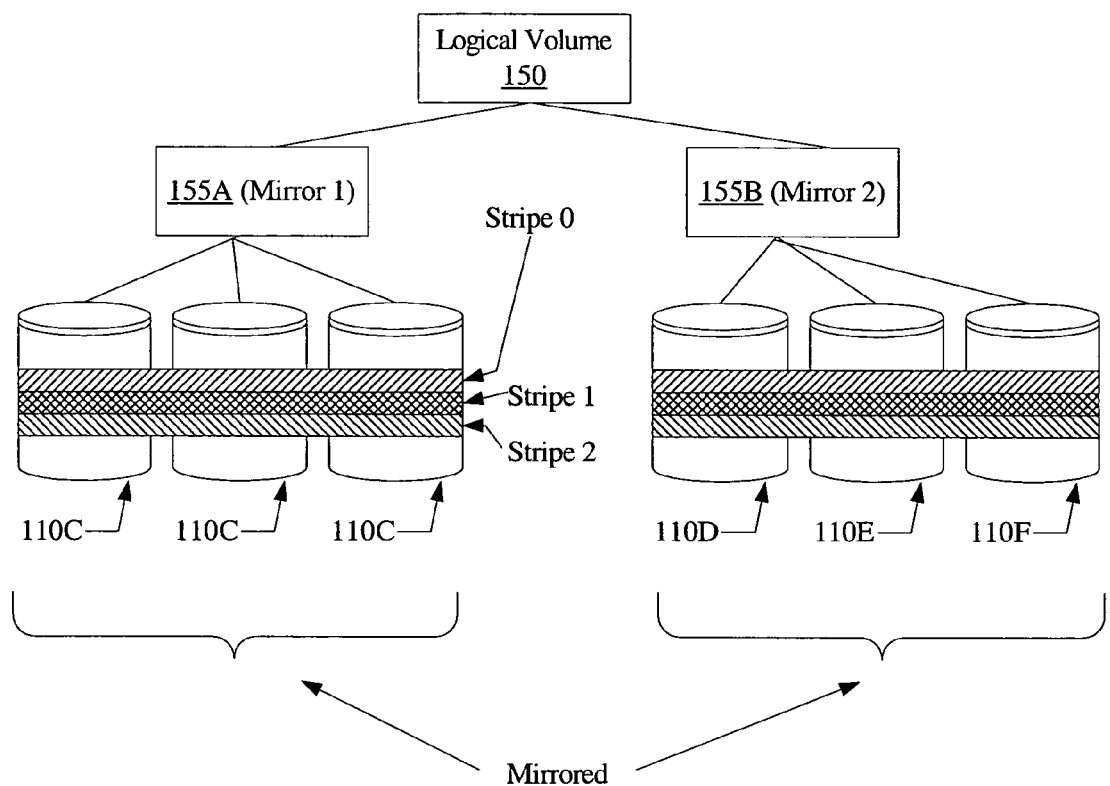
FIG. 3 is a block diagram illustrating an embodiment of a storage system employing a combination of mirroring and striping, which may be termed mirroring over striping.
Figure 4:
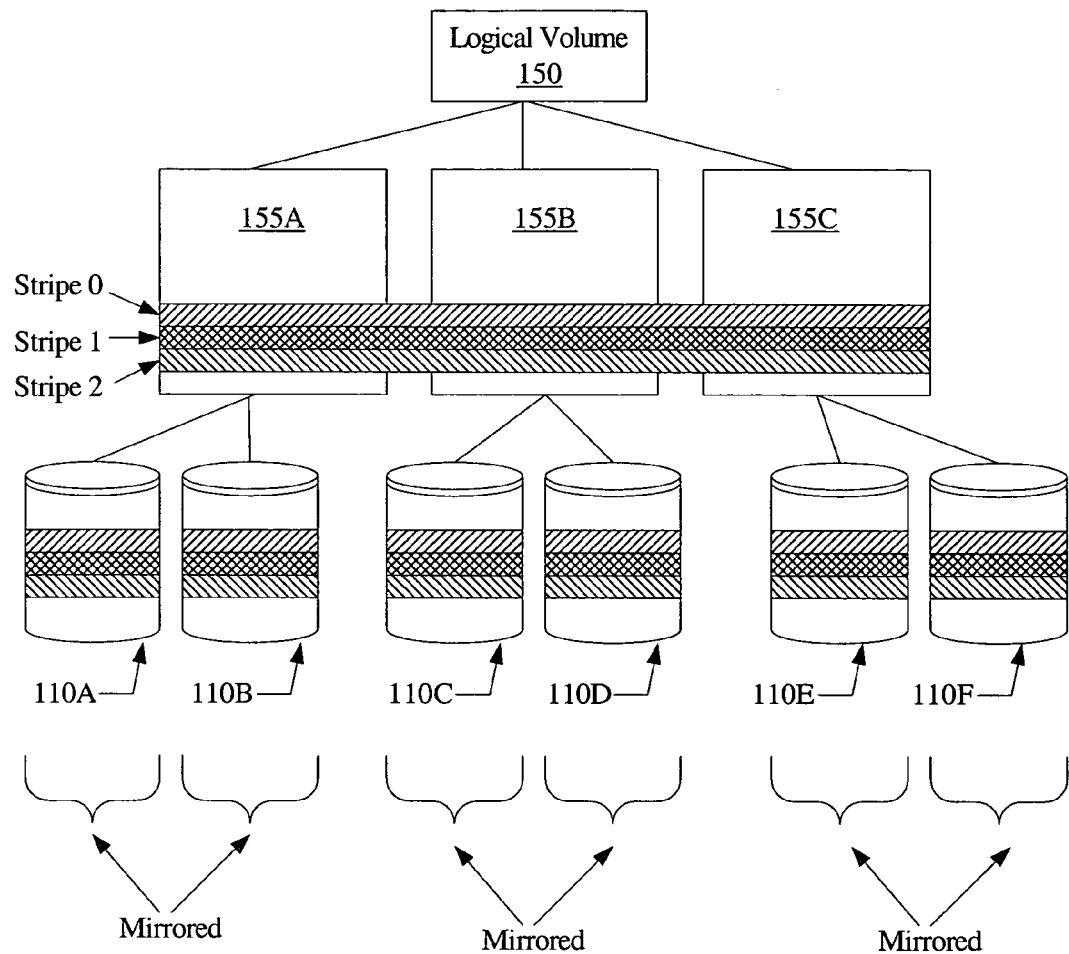
FIG. 4 is a block diagram illustrating another embodiment of a storage system employing a different combination of mirroring and striping, which may be termed striping over mirroring.

In some storage environments, it may be desirable to combine striping (or concatenation) with mirroring, so that storage consumers may obtain the benefits of each form of storage organization. FIG. 3 is a block diagram illustrating an embodiment where data of a logical volume 150 is striped across a first set of three block devices 110A-C, and the first set of block devices is mirrored using a second set of three block devices 110D-F. Such a configuration may be termed "mirroring over striping". In contrast, FIG. 4 illustrates another embodiment where "striping over mirroring" is employed: that is, logical volume 150 may be logically striped across three subordinate devices 155A-C, and the data of each subordinate device 155 may be mirrored using two block devices 110.

Volume server 130 may maintain a mapping between the blocks of logical volume 150 and underlying block devices 110 for storage configurations employing concatenation, striping, or mirroring, or combinations of concatenation or striping with mirroring similar to those described above. Virtualization functionality 140 may be configured to use the mapping to translate an I/O request for a data block at a given logical address within logical volume 150 to one or more I/O requests at constituent block devices 110. In one embodiment, a layout table 145 incorporating the concept of columns may be used to represent the mapping.

FIG. 5 is a block diagram illustrating certain aspects of the organization of a layout table 145 for an exemplary volume 150 according to one embodiment. Layout table 145 may include table metadata 510 and extent entries 520. Table metadata 510 may be used to store the size of volume 150, a stripe unit size U used within the volume, and certain other high-level information about the organization of volume 150 such as the number of columns in the volume (columns, which may also be referred to herein as stripe columns, are explained in further detail below). In the depicted example, the size of volume 150 is 2000 megabytes (MB), stripe units are 64 kilobytes (KB) each, and 3 columns are used.

Storage within a constituent block device 110 may be divided into contiguous sets of blocks called extents, where each extent may map to a range of virtual address space within volume 150, and a given block of a device 110A may belong to at most one extent. Each extent and the virtual address space range to which it is mapped may be represented as a fixed-size extent entry among extent entries 520 (that is, all extent entries may be of the same size, allowing for efficient access and manipulation of layout table 145 by virtualization functionality 140). An extent entry may contain a reference (e.g., a name or a unique ID) identifying the block device 110, such as "Disk 110A", an offset within the block device at which the extent begins (e.g., "0"), and an extent length (e.g., "1200"). In the embodiment depicted in FIG. 5, extent offset and length are expressed in disk blocks (e.g., each disk block may be 512 bytes long), although in other embodiments, the extent offset and length may be expressed in any other appropriate unit such as kilobytes, megabytes etc. The virtual address space range to which the extent is mapped may be indicated by a column number and a column offset (i.e., a starting offset within the column for the mapped range).

A column may be defined as a linear concatenation of space from an underlying physical or logical device corresponding to a logical stripe of a corresponding logical volume. In one simple implementation, for example, there may be a one-to-one correspondence between the number of columns of a striped un-mirrored logical volume and the number of physical block devices providing physical storage for the logical volume. In general, however, a column is a logical construct that may include storage from one or more physical or logical devices, and the number of distinct columns in a given logical volume may correspond to the number of stripes into which the given logical volume is organized. Thus, in embodiments employing column-based striping, a stripe need not be confined to a single underlying block device as illustrated in the simple example depicted in FIG. 2b. An overlap in column addresses between two extent entries 520 in a given layout table (i.e., if the column number for the two entries is the same and at least a portion of the column offsets overlap) is an indication that a copy or mirror of the blocks with the overlapping column addresses exists at each of the corresponding extents. Various examples of layout tables with different column number entries are described below, illustrating the flexible combination of striping and mirroring that may be implemented using column-based striping in combination with extent-based layout tables.

For simplicity, column offsets may be expressed in the same units as extent offsets. (As the length of the virtual address space range is the same as the extent length, an explicit indicator of virtual space range length or ending offset may not be required within the layout table). A column number may be used to indicate the stripe to which the corresponding extent belongs: e.g., if logical volume 150 is simply striped across D block devices 110, the column number for a given extent mapped to logical volume 150 may be between 0 and (D−1) (including 0 and D−1 as possible values) in one embodiment. In addition to an extent address range and a column address range, each extent entry may also contain one or more "flags" fields, as described in further detail below. Numerous other extent entries, similar in structure to those shown in FIG. 5, may exist for volume 150 in layout table 145, but are not included in FIG. 5.

A given data block within a volume 150 that employs both striping and mirroring may be characterized by two kinds of addressing information: striping or column address information (e.g., where the block is located within the stripes of volume 150), and mirroring information (e.g., how many copies there are of each block). Given the number of columns in the logical volume and the stripe unit size (both of which are available from table metadata 510), the column address (i.e., column number and column offset) for a given data block may be obtained, using a formula similar to the one described above in the context of the description of FIG. 2b. (For example, the block device number B and the offset within block device O in the formulas listed earlier may correspond to a column number and column offset in layout table 145.) Once a column address for a given data block is obtained, the extent entry or entries mapped to that column address may be obtained from layout table 145. The number of columns and the stripe unit size may collectively be termed the geometry or stripe geometry of volume 150.

Mirroring may be indicated within layout table 145 by two or more extent entries that contain overlapping virtual address ranges. Thus, if the column address of a data block falls within the column address ranges of two extent entries E1 and E2 within table 145, each of the corresponding extents includes a separate copy of the data block, providing an extra copy to use if one of the extents fails. In FIG. 5, for example, the extent entries for (Disk 110A, Extent Offset 0, Length 1200) and (Disk 110D, Extent Offset 0, Length 1200) overlap in column address range—in both cases, the column address is (column 0, column offset 0). Thus the extent entries for Disk 110A and Disk 110D represent a mirroring of the first 1200 blocks of column 0 of the volume 150 whose layout table is depicted in FIG. 5. Similarly, the extent entries for Disk 110B and Disk 110E each represent a mirror of the first 1200 blocks of column 1, and the extent entries for Disk 110C and 110F each represent a mirror of the first 1200 blocks of column 2. As also indicated by the mirror number field in FIG. 5, the extent entries for Disks 110D-F collectively represent a mirror of the extent entries for Disks 110A-C. Thus, both striping and mirroring may be implemented using the single layout table illustrated in FIG. 5

It is noted that in some embodiments the storage represented by a given extent entry E1 may be mirrored using multiple extent entries E2, E3, etc., instead of the one-to-one relationship between mirrored extents illustrated in FIG. 5. FIG. 6 depicts an example of a layout table 145 where a single extent (Disk 110A, Extent Offset 0, Extent Length 1200) is mirrored at a combination of three extents. The first 400 blocks of the extent on Disk 110A are mirrored at an extent at Disk 110C and Extent Offset 2000. The next 600 blocks are mirrored at an extent at Disk 110C and Extent Offset 3000, and the final 200 blocks of the extent at Disk 110A are mirrored at an extent of Disk 110E and Extent Offset 0.

The use of a layout table 145 as described above may also support partial mirroring of a subset of storage within a volume 150 in some embodiments. For example, the first 600 blocks of extent (Disk 110B, Extent Offset 0, Extent Length 1200) shown in FIG. 6 may be mirrored at the extent on Disk 110F and Extent Offset 400, while the remaining blocks may remain un-mirrored.

In order to determine the number of mirrors that exist for a given logical address range L within a volume 250, therefore, the logical address range L may be first mapped to a column address range C, and the extent entries (if any) whose address ranges collectively fully overlap the given column address range C may be obtained from layout table 145. If more than one extent entry is found for each block within C, then each block of logical address range L may be mirrored. In some embodiments, a "mirror number" or "mirror ID" field may be added to each extent entry within layout table 145, which may provide an explicit naming or numbering for each mirror, in order to be able to quickly identify the extents which may belong to the same mirror.

The use of a layout table 145 may also allow concatenation to be supported as a special case of striping in some embodiments, allowing simple concatenation (linear aggregation of multiple devices or extents) to be flexibly combined with mirroring. In contrast to a striping configuration, which may be represented by different extent entries of layout table 145 with different column numbers, a concatenated volume 150 may be represented by using a single column number for all extents, as depicted in FIG. 7. In the depicted example, volume 150 contains 1500 megabytes (or 3,000,000 blocks of 512 bytes each). A first mirror of volume 150 is concatenated across three block devices (Disk 110 A-C), and a second mirror of volume 150 is concatenated across three other block devices (Disk 110D-F). In addition to supporting combinations of mirroring and striping/concatenation, layout tables as described above may also be used to represent configurations where only one of the three techniques is used (i.e., only concatenation, only striping, or only mirroring). If no two extent entries overlap in column address, for example, and the number of columns used exceeds one, then the layout table may represent an un-mirrored striped configuration.

Over time, the set of block devices 110 available for use in a given storage environment may change; for example, typical disk drive sizes and speeds may increase. The use of layout tables 145 may allow flexible configuration of a volume 150 relying on heterogeneous collections of block devices 110, for example where data stored on smaller disk drives may be mirrored on larger disk drives. FIG. 8 depicts a layout table for one embodiment in which data stored at a collection of 2 GB disks (Disks 920A-C) is mirrored using 3 GB disks (Disks 930A-B). In the depicted layout table, extent lengths and offsets and column offsets are expressed in gigabytes (GB). Six gigabytes of data of volume 150 is stored in three extents of 2 GB each on disks 920A, 920B and 920C respectively. Using 3 GB disks 930A and 930B, the three 2 GB extents may be mirrored at four extents: two extents of 2 GB each, and two extents of 1 GB each. Various other forms of heterogeneity among block devices 110 may also be easily supported using layout tables 145. For example, in one embodiment, block devices 110 of a volume 150 may include disk drives with different disk block sizes. In such an embodiment, each extent entry may also include a field indicating the block size at the corresponding physical block device. Extent lengths, extent offsets and column offsets may be expressed in units such as kilobytes or megabytes rather than in disk blocks in some such embodiments.

As noted previously, in some embodiments block devices 110 whose extents are represented in layout table 145 may also be virtual block devices, i.e., block devices that may themselves be represented by one or more layout tables or some other form of virtual structure. Multiple layers of extent-based layout tables may be employed in such embodiments, and mirroring may be combined with striping or concatenation at one or more layers. In one embodiment, a given layout table 145 may include some extent entries for physical block devices, and other extent entries for virtual block devices. Two or more existing layout tables representing different stripe geometries may also be merged into a single layout table in some embodiments. For example, the layout table metadata 510 may include two different stripe geometries "Geometry A" and "Geometry B", where Geometry A is a six-column striping configuration forming a first mirror, and Geometry B is a three-column striping configuration forming a second mirror. An indication of the particular stripe geometry to use may be included within each extent entry 520 in such an embodiment. Such a merging of two or more geometries may allow, for example, six 20 GB disks to be mirrored using three 40 GB disks. In some embodiments, a logical merging of the two geometries may be performed instead of retaining each geometry separately and including an indication of the geometry to be used for each extent. The basic algorithm for calculating redundancy is the same for each block, but matching overlapping extents is more complex, since extents within columns of different geometries do not overlap based purely on their column numbers and offsets.

As depicted in FIG. 5-FIG. 8, each extent entry of a layout table 145 may contain one or more "flags" fields. Flags fields of an extent entry may be used to indicate status information, access permissions, and other configuration information for the corresponding extent. In one embodiment, for example, a flags field may be a bitmap whose first two bits encode an access permission (e.g., Write-Only, Read-Write, or Read-Only access permissions), a third bit may indicate whether the extent has been disabled due to an I/O error, a fourth bit may indicate whether the contents of the extent are "valid" or are "stale" due to a previous I/O error, or are being synchronized to recover a previously disabled extent, or to bring in a new or replacement extent, etc. Various other kinds of status may also be indicated using the flags field of an extent entry in different embodiments.

Access permissions may indicate the kind of storage operations allowed at a given extent: for example, Write-Only access permission may be granted on an extent that has just been added to mirror an existing extent, during the period when the contents of the newly-added extent are being synchronized with the existing extent. During normal operation, Read-Write or Read-Only access permissions may typically be granted on extents, with Read-Write permission being a default in one embodiment, and Read-Only permission being set in response to a command from a system administrator. In one embodiment, during normal operation, an extent may be designated as "valid" by default. An extent may be designated as "stale" if its data is required to be updated or is being updated, for example during recovery from an error. In addition to encoding status and permissions, flags fields may also be used in responding to I/O errors in a flexible manner, as described below.

In some traditional mirroring implementations, when a write error, (i.e., an indication of a failure to successfully complete a write operation) is received from a mirrored device, the error mirror (i.e., the mirror at which the error occurred) may be disabled or detached. An I/O error may be caused by a variety of factors, including a failure at a physical block device 110 such as a disk, a loss of connectivity in a networked environment, or a firmware or software error. Depending upon the nature of the root cause of the I/O error, one or more repair and/or recovery operations may be performed on the disabled mirror: for example, a disk device may be replaced, or a network link repaired. Data in the disabled mirror may be inaccessible to storage consumers such as volume client 120 until the mirror is repaired or recovered and re-attached to the mirrored volume, which may take a substantial amount of time (e.g., hours). It may therefore be desirable to reduce the amount of storage disabled or detached due to an I/O error. If errors are handled on a per-mirror basis (i.e., a mirror is either fully enabled or fully disabled due to an I/O error), as in some traditional mirroring implementations, an error at a single device 110 may result in the disablement of several other devices that may form part of the same mirror. For example, in the configuration depicted in FIG. 3, a failure at device 110D may result in the disablement of Mirror 2 in a traditional implementation, which may make storage at devices 110E and 110F inaccessible even though no errors may have occurred at either device 110E or device 110F. The use of an extent-based structure such as layout table 145 to represent mirrored storage may allow errors to be handled on a per-extent basis rather than on a per-mirror basis. It is noted that extent-based error handling may also be possible without the use of layout tables, e.g., using a first data structure to represent striping or concatenation and a second data structure to represent mirroring, but typically such traditional implementations may require more complex error-related processing, as well as requiring a potentially much more complex structure of virtual objects.

Figure 9:
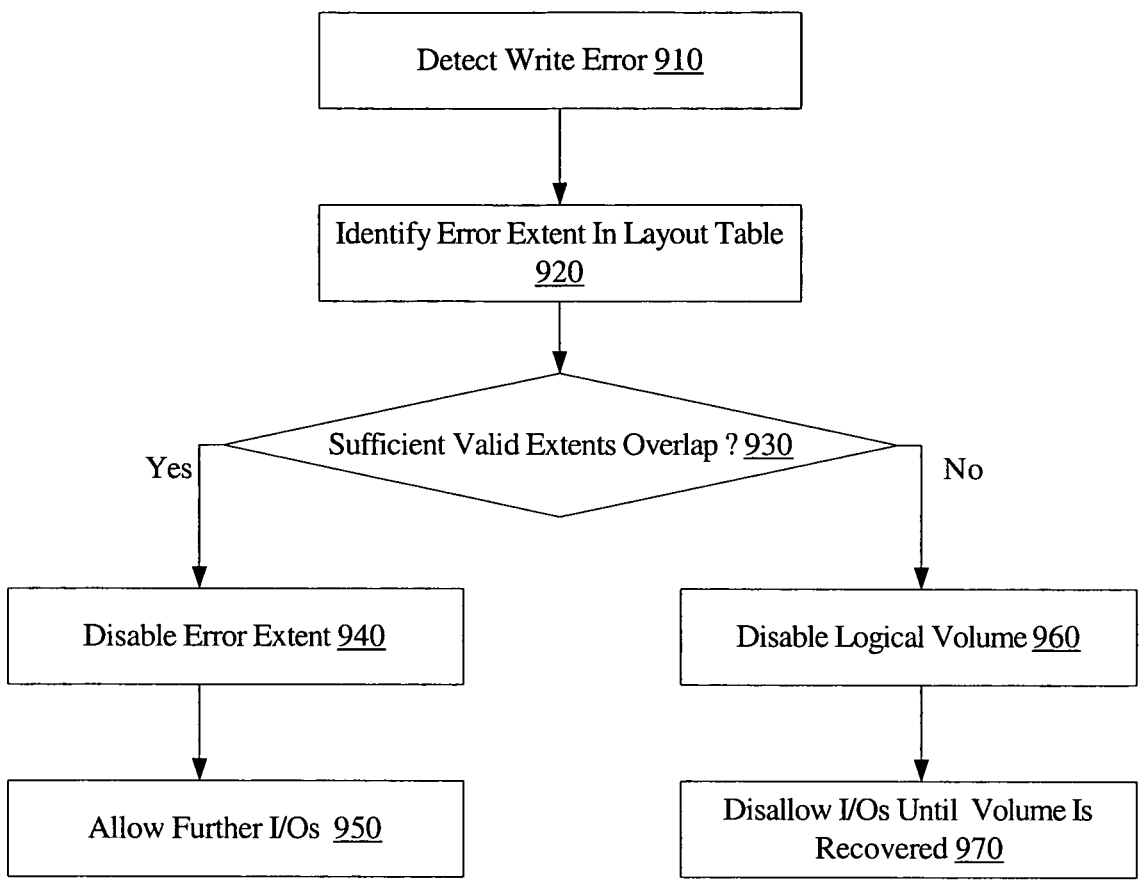
FIG. 9 is a flow diagram illustrating aspects of the operation of virtualization functionality in the event of a write error, according to one embodiment.

FIG. 9 is a flow chart illustrating aspects of the operation of virtualization functionality 140 in the event of a write error at a mirrored volume 150 according to one embodiment. An I/O operation (e.g., a write operation) may be requested by volume client 120 on a block of data at a given virtual address within volume 150. The write operation requested by volume client 120 may be mapped to one or more physical write operations targeted at different extents of underlying devices 110. When a write error is detected (block 910 of FIG. 10) in response to a physical write request, virtualization functionality 140 may identify the "error" extent entry (block 920) within layout table 145, i.e., the entry representing the extent at which the error occurred. Layout table entries representing extents at which no errors have been detected, and extents at which any errors that have been detected have already been repaired, may be termed "non-error" entries herein. Virtualization functionality 140 may then verify whether any other valid non-error extent entries (i.e., entries whose "flags" field indicate a valid status and at which no error has been detected) can be found in table 145 that singly or collectively overlap the "error" virtual address range, i.e., the column address range of the error extent entry (decision block 930). (In some embodiments, as described below, more than one such valid non-error extent entries may be required for access to the logical volume to remain enabled.) If such valid entries are found, indicating that at least one valid mirror exists for all the blocks of the error extent, virtualization functionality 140 may disable the error extent (block 940) (i.e., disallow further I/O operations to the error extent) and allow further I/O operations (block 950) on volume 150. If valid extent entries that overlap the entire column address range of the error extent are not found, indicating that no valid copy or mirror of at least some subset volume 150 exists, the entire volume may be disabled (block 960) and I/Os disallowed until the volume is recovered (block 970). In this manner, the effects of I/O errors may be isolated to the extents at which the error occurs, instead of allowing a single write error to make an entire mirror or entire volume inaccessible.

In general, any desired minimum required number of valid mirrors in order for a mirrored volume to remain enabled may be specified in a given embodiment. If, for example, the minimum number of valid mirrors is set to two in a particular embodiment, the volume may be disabled if the number of valid non-error extents mapped to any given block of the volume falls below two. Thus, the operations corresponding to block 930 of FIG. 9 may include a verification that the specified minimum number of valid non-error overlapping entries exist in the layout table. If at least the desired minimum number of valid non-error overlapping entries is found, the error extent may be disabled, while I/O operations may be allowed to continue to the valid non-error extents, as depicted in blocks 940 and 950. If the desired minimum number of valid non-error overlapping entries is not found, the entire volume may be disabled until some form of recovery can be completed, for example as depicted in blocks 960 and 970.

Figure 10:
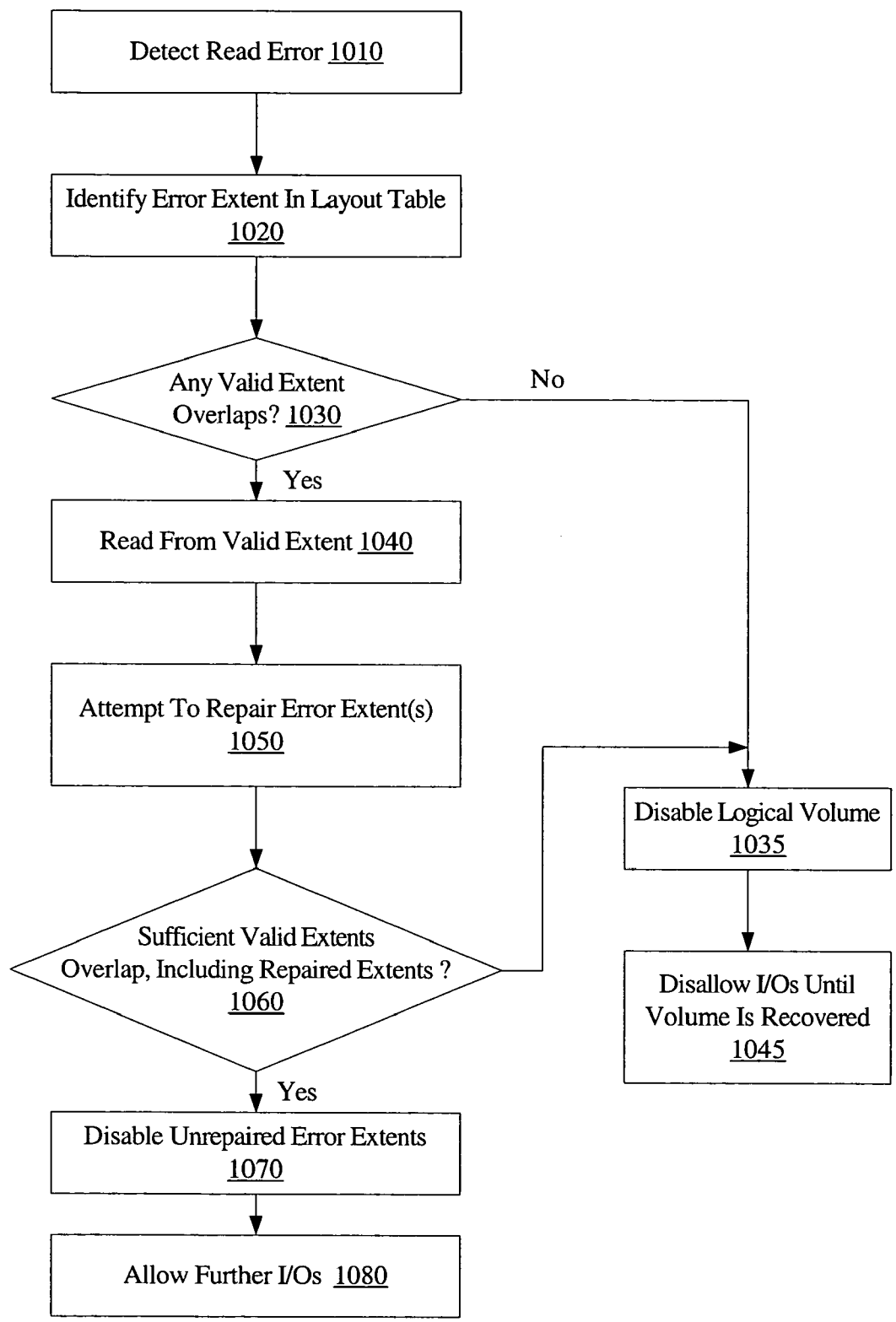
FIG. 10 is a flow diagram illustrating aspects of the operation of virtualization functionality in the event of a read error, according to one embodiment.

FIG. 10 is a flow chart illustrating aspects of the operation of virtualization functionality 140 in the event of a read error at a mirrored volume 150 according to one embodiment. An attempt to read a given target block of a target extent may sometimes result in a read error. In response to a detection of the read error (block 1010), virtualization functionality 140 may be configured to identify the corresponding extent entry as an "error" entry (block 1020). If any valid, non-error extents overlapping the target block exist within the layout table (as detected in decision block 1030), virtualization functionality 140 may be configured to read the target block from a first extent of any such overlapping non-error extents (block 1040). If the read succeeds, one or more attempts to repair the error extent may be made (block 1050), for example by writing the data read from the target block in a non-error extent to the error extent. If the read fails, the first extent may itself be identified or marked as an error extent, and additional attempts to read the target block from other overlapping non-error extents may be made in some embodiments, until either a successful read occurs, or all overlapping extents have been identified as error extents and the volume 150 has therefore been disabled.

If an attempt to repair an error entry succeeds, the error entry may be returned to a valid, non-error state, e.g., by modifying one or more bits in a bitmap representing a flags field for the extent. If multiple error entries (i.e., multiple extents from which read errors at the target block are received) exist in the layout table, an attempt to repair each of the multiple error entries may be made in one embodiment, while in other embodiments only enough entries to reach a minimum desired number of valid non-error entries mapped to the target extent may be repaired. After the repair attempts have been made, virtualization functionality 140 may be configured to verify that a specified minimum number of valid, non-error entries overlapping the entire target extent, including successfully repaired entries, now exist in the layout table (block 1060). If the verification succeeds, any remaining unrepaired error extents may be disabled (block 1070) and I/O allowed to continue to the logical volume 150 (block 1080). If the verification fails, logical volume 150 may be disabled (block 1035) and I/Os disallowed until the volume (i.e., sufficient extents within the volume) are recovered (block 1045).

Variations of the error-handling techniques described above may be used in different embodiments. For example, multiple attempts to write a data block may be made before the corresponding extent is disabled in some embodiments. In one embodiment, if a read operation for a data block fails, a second attempt to read the requested block may be made from a second volume client 120 or volume server 130. If the second attempt fails, the corresponding extent may be disabled as described above. If the second read succeeds, an attempt to write the data block may be made from the original requester. If the write fails, the write error handling technique described above may be employed, while if the write succeeds, no further corrective action may be taken.

In some embodiments, various other functions may also be provided by virtualization functionality 140, in addition to striping, concatenation and mirroring, such as the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Virtualization functionality 140 may provide any or all of these capabilities in a fashion transparent to virtualized block device consumers such as volume clients 120. That is, virtualized block devices may appear as generic storage devices to consumers such as file systems and applications. Volume server 130 may also provide functions such as configuration management of virtualized block devices and distributed coordination of block device virtualization.

In one embodiment, volume clients 120 may be provided with a description of a virtualized block device, such as part or all of layout table 145, and may be configured to directly access constituent block devices comprising the virtualized device. Such virtualization may also be referred to as host-based or client-based virtualization. Each volume client 120 may be configured to interact with volume server 130 for certain functions, for example management or administrative functions. For typical block read and write activity, each volume client 120 may be configured to interact directly with various block devices 110 according to the volume description distributed by volume server 130. Distribution of a virtualized block device as a volume to one or more volume clients 120 may also be referred to as distributed block virtualization.

In some embodiments, details of block virtualization may not be directly available to individual volume clients 120. In some such embodiments, the virtualization functionality 140 of volume server 130 may be implemented in a device or layer of abstraction in between volume clients 120 and block devices 110, such as a switch or virtualization appliance. Such virtualization may also be referred to as switch-based or appliance-based virtualization.

Additionally, in some embodiments, multiple layers of virtualization may be employed, for example at the host level as well as at the switch or appliance level. In such embodiments, some aspects of virtualization may be visible to volume clients 120, as in the host-based model, while some aspects may be implemented transparently by an intermediate device, as in the switch-based model. Further, in some multilayer embodiments, the virtualization details of one block device (e.g., one volume 150) may be fully defined to a volume client 120 (i.e., without further virtualization at the switch layer), while the virtualization details of another block device (e.g., another volume) may be partially or entirely transparent to volume client 120. In one embodiment, virtualization software 140 may be configured to read and update configuration information corresponding to volume descriptions (such as layout table 145) from a configuration database. That is, a copy of layout table 145 for a volume 150 may be stored in persistent storage as part of the configuration database, while another copy may be maintained in volatile storage such as RAM. The configuration information may also be stored on the devices (e.g., block devices 110A-C) that are being virtualized in some embodiments.

The configuration associated with a virtual block device may change over time, such as to add or remove mirrors or change striping parameters; migrate data to new storage; increase or decrease the size of the device; create, manipulate, or remove snapshots; add structure for a new capability; etc. During some configuration changes two layout tables 145 may be in use for a given volume 150 for some periods of time. To accomplish a reorganization from a 4-column layout to a 5-column layout, for example, virtualization functionality 140 may create a new, empty layout table for the 5-column layout. Virtualization functionality 140 may then iterate through the extent entries in the original 4-column layout table, converting one extent at a time and copying data as necessary between underlying block devices 110. In one embodiment, for example, conversion of an extent may include reading the extent from one block device 110, logging contents in a log device, writing the extent at a new block device 110 according to the 5-column layout, and updating an entry in the new layout table. While an extent is being converted, regular I/O to that extent by volume clients 120 may be disabled, but I/O to other extents may be allowed. After a conversion of an extent, the original 4-column extent entry may be marked as invalid using a flags field, and I/Os directed to the extent may be managed using the new extent entry. When conversion of the entire volume 150 is complete, the old layout table may be deleted. By reorganizing volumes using extent-based layout tables 145, i.e., by allowing volume clients 120 to access most of volume 150 during reorganization as described above, the impact of volume reorganization on normal I/O by volume clients 120 may be reduced.

In some embodiments, if the volume description (including layout table 145) of a given volume 150 is distributed to more than one volume client 120, any changes that affect the structure of the given volume 150 (such as the reorganization described above) may need to be coherently coordinated among the relevant volume clients 120. In one embodiment volume server 130 may be configured to coordinate such changes. For example, volume server 130 may be configured to coordinate quiescence of those volume clients 120 to which the given volume 150 is distributed, in order to temporarily suspend activity to one or more extents of a given volume 150. Volume server 130 may further distribute changes to the structure of given volume 150 to relevant volume clients 120 in an effectively atomic fashion, such that either all or none of the relevant clients 120 receive the changes.

Volume server 130 may be configured to distribute all defined volumes 150 to each volume client 120 present within a system in some embodiments. Such embodiments may be referred to as symmetric distributed block virtualization systems. In other embodiments, specific volumes may be distributed only to respective volume clients 120, such that at least one volume 150 is not common to two volume clients 120. Such embodiments may be referred to as asymmetric distributed block virtualization systems.

In general, a volume server 130 may be any device or software module capable of providing volume server functionality as described above, such as a server computer system, including one or more processors and one or more system memories. Some volume server functionality, including virtualization functionality 140, may be spread over multiple computer servers or hosts in some embodiments. To provide high availability for volume server functionality, volume server 130 may be configured to run on a cluster of nodes, where a failure at one node may result in the volume server functionality running on that node to be taken over at another node.

A volume client 120 may be any type of device capable of interacting with a given volume 150 for data storage and retrieval. For example, in one embodiment a volume client 120 may be a server computer system, including one or more processors and one or more system memories, where the server system is configured to execute software such as one or more operating systems and/or applications. In another embodiment, a volume client 120 may be a client computer system configured to access a given volume 150 via a separate server computer system. A volume client 120 may also be hosted within a virtualization switch that provides additional layers of virtualization on top of a volume 150. In other embodiments, a volume client 120 may be an embedded system configured to use application specific integrated circuit (ASIC) or field-programmable gate array (FPGA) technology to execute operations whereby a given volume 150 may be accessed. In some embodiments a volume client 120 and a volume server 130 may be co-located within the same server. Numerous other configurations of volume servers 130 and volume clients 120 are possible and contemplated.

Figure 11:
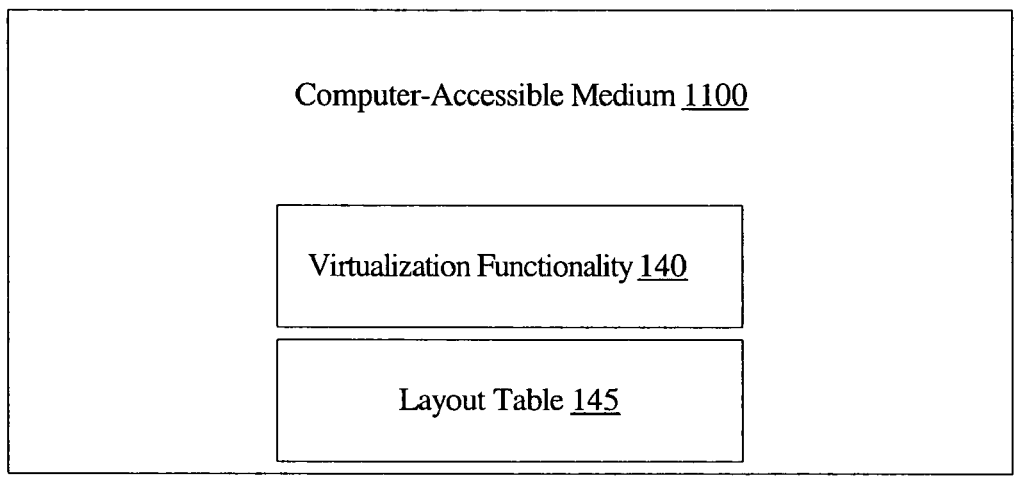
FIG. 11 is a block diagram illustrating a computer-accessible medium.

FIG. 11 shows one embodiment of a computer-accessible medium 1100 comprising a representation of layout table 145 and instructions, which, when executed, provide virtualization functionality 140 as described above. Generally speaking, the computer-accessible medium may include storage media such as magnetic or optical media such as RAM (e.g., SDRAM, RDRAM, SRAM, etc.), ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A volume server comprising:
   one or more processing units; and
   a storage medium storing program instructions executable by the one or more processing units to implement:
   virtualization functionality configured to aggregate storage within one or more block devices into a logical volume accessible to a volume client; and
   a layout table, wherein the layout table includes a plurality of entries,
      wherein each entry of the plurality of entries includes:
         an identification of an extent on a block device of the one or more block devices; and
         a virtual address range indicative of a stripe of the logical volume to which the extent is mapped;
      wherein a first virtual address range of a first entry of the plurality of entries overlaps with a second virtual address range of a second entry of the plurality of entries; and
      wherein an overlap of the first virtual address range and the second virtual address range is indicative of a mirroring of at least a portion of the first virtual address range;
   wherein the virtualization functionality is configured to:
      access the layout table to obtain one or more block device addresses corresponding to a logical volume virtual address of a storage operation requested by the volume client;
      select an error entry from the layout table in response to a detection of a write error at a target extent;
      verify that a combined address range of one or more valid non-error entries in the layout table fully overlaps the target extent;
      verify that a combined address range of one or more valid non-error entries in the layout table fully overlaps the target extent;

disallow I/O operations at the target extent; and allow I/O operations to be performed on extents of the logical volume other than the target extent.

2. The volume server as recited in claim 1, wherein each entry of the plurality of entries further includes a validity indication of the corresponding extent.

3. The volume server as recited in claim 1, wherein each entry of the plurality of entries further includes an indication of an access permission for the corresponding extent.

4. The volume server as recited in claim 1, wherein the virtualization functionality is further configured to disable access to the logical volume via the layout table if the number of valid non-error extents mapped to any block of the logical volume falls below a specified minimum value.

5. The volume server as recited in claim 1, wherein at least one of the one or more block devices is a virtual block device.

6. The volume server as recited in claim 1, wherein at least one of the one or more block devices is a physical block device.

7. The volume server as recited in claim 1, wherein the virtualization functionality is further configured to provide a copy of the layout table to the volume client.

8. The volume server as recited in claim 1, wherein each entry of the plurality of entries further includes a mirror identifier.

9. The volume server as recited in claim 1, wherein the layout table has associated table metadata, wherein the metadata includes a representation of a stripe geometry for the logical volume.

10. A method comprising:

aggregating storage within one or more block devices into a logical volume;

making the logical volume accessible to a volume client;

accessing a layout table for the logical volume to obtain one or more block device addresses corresponding to a virtual address of a storage operation requested by the volume client, wherein the layout table includes a plurality of entries, wherein each entry of the plurality of entries includes:

an identification of an extent on a block device of one or more block devices; and a virtual address range indicative of a stripe of the logical volume to which the extent is mapped; and wherein a first virtual address range of a first entry of the plurality of entries overlaps with a second virtual address range of a second entry of the plurality of entries; and wherein an overlap of the first virtual address range and the second virtual address range is indicative of a mirroring of at least a portion of the first virtual address range;

selecting an error entry from the layout table in response to a detection of a write error at a target extent;

verifying that a combined address range of one or more valid non-error entries in the layout table fully overlaps the target extent;

disallowing I/O operations at the target extent; and allowing I/O operations to be performed on extents of the logical volume other than the target extent.

11. The method as recited in claim 10, wherein each entry of the plurality of entries further includes a representation of a validity status of the corresponding extent.

12. The method as recited in claim 10, wherein each entry of the plurality of entries further includes a representation of an access mode for the corresponding extent.

13. The method as recited in claim 10, further comprising:

disabling access to the logical volume via the layout table if the number of valid non-error extents mapped to any block of the logical volume falls below a specified minimum value.

14. The method as recited in claim 10, wherein at least one of the one or more block devices is a virtual block device.

15. The method as recited in claim 10, further comprising:

providing a copy of the layout table to the volume client.

16. The method as recited in claim 10, wherein the layout table has associated table metadata, wherein the metadata includes an indication of a stripe geometry for the logical volume.

17. A computer-accessible storage medium comprising program instructions, wherein the program instructions are computer-executable to:

aggregate storage within one or more block devices into a logical volume;

make the logical volume accessible to a volume client;

access a layout table for a logical volume to obtain one or more block device addresses corresponding to a virtual address at which a storage operation has been requested, wherein the layout table includes a plurality of entries, wherein each entry of the plurality of entries includes:

an identification of an extent on a block device of one or more block devices; and a virtual address range indicative of a stripe of the logical volume to which the extent is mapped; and wherein a first virtual address range of a first entry of the plurality of entries overlaps with a second virtual address range of a second entry of the plurality of entries; and wherein an overlap of the first virtual address range and the second virtual address range is indicative of a mirroring of at least a portion of the first virtual address range;

select an error entry from the layout table in response to a detection of a write error at a target extent;

verify that a combined address range of one or more valid non-error entries in the layout table fully overlaps the target extent;

disallow I/O operations at the target extent; and allow I/O operations to be performed on extents of the logical volume other than the target extent.

18. The computer-accessible storage medium as recited in claim 17, wherein each entry of the plurality of entries further includes a representation of a validity status of the corresponding extent.

19. The computer-accessible storage medium as recited in claim 17, wherein each entry of the plurality of entries further includes a representation of an access mode for the corresponding extent.

20. The computer-accessible storage medium as recited in claim 17, wherein the program instructions are further computer-executable to:

disable access to the logical volume via the layout table if the number of valid non-error extents mapped to any block of the logical volume falls below a specified minimum value.

21. The computer-accessible storage medium as recited in claim 17, wherein at least one of the one or more block devices is a virtual block device.

22. The computer-accessible storage medium as recited in claim 17, wherein the program instructions are further computer-executable to:

provide a copy of the layout table to a volume client.

23. The computer-accessible storage medium as recited in claim 17, wherein the layout table has associated table metadata, wherein the metadata includes a representation of a stripe geometry for the logical volume.

24. A volume server comprising:
one or more processing units; and
a storage medium storing program instructions executable by the one or more processing units to implement:
virtualization functionality configured to aggregate storage within one or more block devices into a logical volume accessible to a volume client; and
a layout table, wherein the layout table includes a plurality of entries, wherein each entry of the plurality of entries includes:
an identification of an extent on a block device of the one or more block devices; and
a virtual address range indicative of a stripe of the logical voltage to which the extent is mapped;
wherein a first virtual address range of a first entry of the plurality of entries overlaps with a second virtual address range of a second entry of the plurality of entries; and
wherein an overlap of the first virtual address range and the second virtual address range is indicative of a mirroring of at least a portion of the first virtual address range;
wherein the virtualization functionality is configured to:
access the layout table to obtain one or more block device addresses corresponding to a logical volume virtual address of a storage operation requested by the volume client;
select an error entry from the layout table in response to a detection of a read error at a target block of a target extent;
read the target block from a valid non-error entry of the layout table;
verify that a combined address range of one or more valid non-error entries in the layout table fully overlaps the target extent;
disallow I/O operations at the target extent; and
allow I/O operations to be performed on extents of the logical volume other than the target extent.

25. The volume server as recited in claim 24, wherein the virtualization functionality is further configured to attempt a repair of the error entry, and wherein a successful repair of the error entry results in a return of the error entry into a valid non-error state.

26. The volume server as recited in claim 25, wherein the repair of the error entry includes a write to the error entry of a valid version of data of the target block read from a valid non-error entry.

27. The volume server as recited in claim 25, wherein the virtualization functionality is further configured to disable access to the logical volume via the layout table if the number of valid non-error extents, including successfully repaired extents, mapped to any block of the logical volume falls below a specified minimum value.

28. A method comprising:
aggregating storage within one or more block devices into a logical volume;
making the logical volume accessible to a volume client;
accessing a layout table for the logical volume to obtain one or more block device addresses corresponding to a virtual address of a storage operation requested by the volume client,
wherein the layout table includes a plurality of entries, wherein each entry of the plurality of entries includes:
an identification of an extent on a block device of one or more block devices; and
a virtual address range indicative of a stripe of the logical volume to which the extent is mapped; and
wherein a first virtual address range of a first entry of the plurality of entries overlaps with a second virtual address range of a second entry of the plurality of entries; and
wherein an overlap of the first virtual address range and the second virtual address range is indicative of a mirroring of at least a portion of the first virtual address range;
selecting an error entry from the layout table in response to a detection of a read error at a target block of a target extent;
reading the target block from a valid non-error entry of the layout table;
verifying that a combined address range of one or more valid non-error entries in the layout table fully overlaps the target extent;
disallowing I/O operations at the target extent; and
allowing I/O operations to be performed on extents of the logical volume other than the target extent.

29. The method as recited in claim 28, further comprising:
attempting a repair of the error entry; and
returning the error entry into a valid non-error state upon a successful repair of the error entry.

30. The method as recited in claim 29, wherein the repair of the error entry includes a write to the error entry of a valid version of data of the target block read from a valid non-error entry.

31. The method as recited in claim 29, further comprising:
disabling access to the logical volume via the layout table if the number of valid non-error extents, including successfully repaired extents, mapped to any block of the logical volume falls below a specified minimum value.

32. A computer-accessible storage medium comprising program instructions, wherein the program instructions are computer-executable to:
aggregate storage within one or more block devices into a logical volume;
make the logical volume accessible to a volume client; and
access a layout table for a logical volume to obtain one or more block device addresses corresponding to a virtual address at which a storage operation has been requested, wherein the layout table includes a plurality of entries, wherein each entry of the plurality of entries includes:
an identification of an extent on a block device of one or more block devices; and
a virtual address range indicative of a stripe of the logical volume to which the extent is mapped; and
wherein a first virtual address range of a first entry of the plurality of entries overlaps with a second virtual address range of a second entry of the plurality of entries; and
wherein an overlap of the first virtual address range and the second virtual address range is indicative of a mirroring of at least a portion of the first virtual address range;
select an error entry from the layout table in response to a detection of a read error at a target block of a target extent;
read the target block from a valid non-error entry of the layout table;
verify that a combined address range of one or more valid non-error entries in the layout table fully overlaps the target extent;

disallow I/O operations at the target extent; and
allow I/O operations to be performed on extents of the logical volume other than the target extent.

33. The computer-accessible storage medium as recited in claim 32, wherein the program instructions are further computer-executable to:
attempt a repair of the error entry; and
return the error entry into a valid non-error state upon a successful repair of the error entry.

34. The computer-accessible storage medium as recited in claim 33, wherein the repair of the error entry includes a write to the error entry of a valid version of data of the target block read from a valid non-error entry.

35. The computer-accessible storage medium as recited in claim 33, wherein the program instructions are further computer-executable to:
disable access to the logical volume via the layout table if the number of valid non-error extents, including successfully repaired extents, mapped to any block of the logical volume falls below a specified minimum value.

* * * * *